United States Patent
Feinberg et al.

(10) Patent No.: US 7,039,067 B2
(45) Date of Patent: May 2, 2006

(54) METHODS AND SYSTEMS FOR HYBRID INTERFACES AND ARCHITECTURES FOR OPTICAL COMMUNICATIONS

(75) Inventors: Lee Daniel Feinberg, Silver Spring, MD (US); Brent Ashley Miller, Baltimore, MD (US); William C. Phillips, Ellicott City, MD (US)

(73) Assignee: Dorsal Networks, Inc., Columbia, MD (US)

(*) Notice: Subject to any disclaimer, the term of this patent is extended or adjusted under 35 U.S.C. 154(b) by 861 days.

(21) Appl. No.: 09/917,171

(22) Filed: Jul. 30, 2001

(65) Prior Publication Data

US 2003/0021300 A1 Jan. 30, 2003

(51) Int. Cl.
*H04L 12/56* (2006.01)

(52) U.S. Cl. .................................. 370/468; 370/535

(58) Field of Classification Search ................ 370/464, 370/465, 468, 498, 535, 536, 537, 538; 398/54, 398/56
See application file for complete search history.

(56) References Cited

U.S. PATENT DOCUMENTS

| | | | |
|---|---|---|---|
| 5,764,405 A | 6/1998 | Alphonsus | |
| 5,912,755 A | 6/1999 | Bergano | |
| 5,912,761 A | 6/1999 | Jander et al. | |
| 5,938,309 A | 8/1999 | Taylor | |
| 5,946,119 A | 8/1999 | Bergano et al. | |
| 5,966,206 A | 10/1999 | Jander | |
| 6,014,479 A | 1/2000 | Darcie | |
| 6,057,950 A | 5/2000 | Bergano | |
| 6,084,694 A * | 7/2000 | Milton et al. | 398/83 |
| 6,147,796 A | 11/2000 | Ma et al. | |
| 6,304,351 B1 | 10/2001 | Pedersen | |
| 6,310,709 B1 | 10/2001 | Bergano | |
| 6,327,250 B1 | 12/2001 | Chen et al. | |
| 6,341,023 B1 | 1/2002 | Puc | |
| 6,433,904 B1 * | 8/2002 | Swanson et al. | 398/91 |
| 6,532,320 B1 * | 3/2003 | Kikuchi et al. | 385/24 |

OTHER PUBLICATIONS

Gadiraju et al. "Channel Protection Switching in WDM Mesh Networks". IEEE. May 29-31, 2001. pp. 26-30.*
Dick et al. "Configurable Logic for Digital Communications: Some Singal Processing Perspectives". IEEE. Aug. 1999. pp. 107-111.*
Afferton et al. "Optical Networking—A Multi-service Global Carrier's View". IEEE. Nov. 8-11, 1999. pp. 399-400.*
P.K. Runge et al., "AT&T Optical Amplifier Systems" AT&T Bell Laboratories Pub., pp. 72-77.

(Continued)

*Primary Examiner*—Ricky Q. Ngo
*Assistant Examiner*—Derrick W Ferris

(57) ABSTRACT

A hybrid interface for handling different types of data streams is disclosed. Both OC192 and OC768 data streams can be transported between terrestrial and submarine systems using hybrid interfaces. Examples include processing branches that use common FEC units, multiplexers, demultiplexers, transmitters and receivers for both types of data streams. WDM channels are allocated in groups for OC768 data stream handling. Time misalignment between received channels within a group is identified and compensated.

59 Claims, 7 Drawing Sheets

OTHER PUBLICATIONS

AT&T Technical Journal, "Undersea Communications Technology", Jan./Feb. 1995, vol. 74, No. 1, pp. 1-103.

N.S. Bergano, "Undersea Amplified Lightwave Systems Design" AT&T Laboratories Pub., pp. 302-335.

Ravi S. Shankar, Managing the Management Communications Network in Optical Transport Systems, Oct./Dec., 1999, pp. 155-170.

C. de Maindreville et al., Submarine Network Management: Architectural Issues, "Abstract", pp. 573-580.

Bell Labs Technical Journal, Oct.-Dec. 1999, pp. 138-154.

Ellen Brain et al., "Ten Years of Operating Light Wave Systems" pp. 203-209.

Curtis A Siller, Jr., "Sonet SDH—A Sourcebook of Synchronous Networking", IEEE Press, pp. 262-265.

"Digital Communicatins—Fundamentals and Applications", Chapter 9, "Multiplexing and Multiple Access", pp. 475 and 480.

Yanjun Zhu and W.S. Lee et al., Eight-channel 40 Gb/s RZ transmission over four 80 km spans (328 km) of NDSF with a net dispersion tolerance in excess of 180 ps/nm, pp., 51-53.

Howard Kidorf et al., "Performance improvement in high capacity, ultra-long distance, WDM systems using forward error correction codes", 4 Pages.

M. Murakami et al., "Long-Haul 16×10 WDM Transmission Experiment Using Higher Order Fiber Dispersion Management Technique", Sep. 1998, Madrid Spain, pp. 313-314.

Sergio Tsuda et al., "Transmission of 80×10 Gbit/s WDM Channels with 50 GHz Spacing Over 500 km of LEAF Fiber", pp. 1-4.

Taktronix—Sonet Telecommunications, "Sonet Multiplexing Hierarchy", pp. 1-9.

John Schroter, OC-192 Transponder Interface to Framer IC, "The Magic In Unlimited Bandwidth", Hitachi Semiconductor (American), Inc., Nov. 2000, pp. 1-23.

International Telecommunication Union, G.975 (Oct. 2000), "Series G: Transmission Systems and Media, Digital Systems and Networks", pp. 1-17.

K. Takada et al., Low-cross-talk polarization-insensitive 10-GHz-spaced 128-channel arrayed-waveguide grating multiplexer-demultiplexer achieved with photosensitive phase adjustment, Optic Letters, vol. 26, No. 2, Jan., 2001, pp. 64-65.

Arvind Raghavan, Vitesse, Device Overhead Access Port Description, Dec., 2000, pp. 1-26.

Bell Labs Technical Journal, Figure 1 Structure of the SONET operations network, Oct./Dec., 1999, pp. 139-154.

Morten Ibsen et al., "8- and 16-Channel All-Fiber DFB Laser WDM Transmitters with Integrated Pump Redundancy", IEEE 1999.

Ivan P. Kaminow et al., "Optical Fiber Telecommunications IIIA", Lucent Technologies, pp. 60-61, 279-281, and 330.

References, Chirped return-to-zero source used in 8×10 Gbit/s transmission over 2000km of standard singlemode fibre, Electronic Letters, Aug., 2000, vol. 36, No. 16, pp. 1399-1400.

Altera—White Paper, "Forward Error Correction enhances the performance of tomorrow's high-speed telecommunication networks", SN 034421-SN 034427.

* cited by examiner

METHODS AND SYSTEMS FOR HYBRID INTERFACES AND ARCHITECTURES FOR OPTICAL COMMUNICATIONS

FIELD OF INVENTION

This invention relates generally to optical communication networks and, more particularly, to methods and systems for providing hybrid data stream interfaces between different optical communication systems, e.g., terrestrial systems and submarine systems.

BACKGROUND OF THE INVENTION

From the advent of the telephone, people and businesses have craved communication technology and its ability to transport information in various formats, e.g., voice, image, etc., over long distances. Typical of innovations in communication technology, recent developments have provided enhanced communications capabilities in terms of the speed at which data can be transferred, as well as the overall amount of data being transferred. As these capabilities improve, new content delivery vehicles, e.g., the Internet, wireless telephony, etc., drive the provision of new services, e.g., purchasing items remotely over the Internet, receiving stock quotes using wireless short messaging service (SMS) capabilities etc., which in turn fuels demand for additional communications capabilities and innovation.

Recently, optical communications have come to the forefront as a next generation communication technology. Advances in optical fibers over which optical data signals can be transmitted, as well as techniques for efficiently using the bandwidth available on such fibers, such as wavelength division multiplexing (WDM), have resulted in optical technologies being the technology of choice for state-of-the-art long haul communication systems.

Depending upon the relative locations of the data source and the intended recipient, optical data signals may traverse different optical communication systems in their path between the two locations, e.g., for trans-Atlantic data connections. For example, optical signals may traverse both a terrestrial optical communication system and a submarine optical communication system. As shown in FIG. 1, a terrestrial signal is processed in a WDM terminal 12 of a submarine optical communication system 10 for transmission via optical fiber 14. For long haul optical communications, e.g., greater than several hundred kilometers, the optical signal is periodically amplified to compensate for the tendency of the data signal to attenuate. Therefore, in the submarine system 10, line units 16 amplify the transmitted signal so that it arrives at WDM terminal 18 with sufficient signal strength (and quality) to be successfully transformed back into a terrestrial signal.

Conventionally, erbium-doped fiber amplifiers (EDFAs) have been used for amplification in the line units 16 of such systems. As seen in FIG. 2(a), an EDFA employs a length of erbium-doped fiber 20 inserted between the spans of conventional fiber 22. A pump laser 24 injects a pumping signal having a wavelength of, for example, approximately 1480 nm into the erbium-doped fiber 20 via a coupler 26. This pumping signal interacts with the f-shell of the erbium atoms to stimulate energy emissions that amplify the incoming optical data signal, which has a wavelength of, for example, about 1550 nm. One drawback of EDFA amplification techniques is the relatively narrow bandwidth within which this form of resonant amplification occurs, i.e., the so-called erbium spectrum. Future generation systems will likely require wider bandwidths than that available from EDFA amplification in order to increase the number of channels (wavelengths) available on each fiber, thereby increasing system capacity.

Distributed Raman amplification is one amplification scheme that can provide a broad and relatively flat gain profile over a wider wavelength range than that which has conventionally been used in optical communication systems employing EDFA amplification techniques. Raman amplifiers employ a phenomenon known as "stimulated Raman scattering" to amplify the transmitted optical signal. In stimulated Raman scattering, as shown in FIG. 2(b), radiation from a pump laser 24 interacts with a gain medium 22 through which the optical transmission signal passes to transfer power to that optical transmission signal. One of the benefits of Raman amplification is that the gain medium can be the optical fiber 22 itself, i.e., doping of the gain material with a rare-earth element is not required as in EDFA techniques. The wavelength of the pump laser 24 is selected such that the vibration energy generated by the pump laser beam's interaction with the gain medium 22 is transferred to the transmitted optical signal in a particular wavelength range, which range establishes the gain profile of the pump laser.

Regardless of the amplification technique(s) employed, mechanisms are provided for, e.g., organizing the information in the optical signals, providing capacity management and activating backup protection schemes, typically by way of a protocol layer, e.g., Synchronous Optical Network (SONET). Among other things, SONET standardizes the rates at which data streams are transmitted via optical data signals using the Optical Carrier (OC) system. For example, an OC48 data stream carries data at a rate of about 2.5 Gb/s (including overhead) and an OC192 data stream carries data at a rate of about 10 Gb/s (again including overhead). Many of today's WDM optical communication systems transmit OC192 data streams over each channel.

To prepare terrestrial optical signals for transmission over a submarine optical network, or to prepare submarine optical signals for transmission over a terrestrial network, an interface between the terrestrial optical signals and the submarine optical signals is typically provided. Today's interfaces typically provide for the transmission of terrestrial optical signals over a submarine optical system using OC192 data streams. As development of optical systems progresses, and demand for bandwidth increases, it is envisioned that the communications market may progress from common usage of 10 Gb/s data streams (OC192) to common usage of 40 Gb/s data streams (OC768). During the transition period, it is likely that both data rates will be commonplace in optical communication systems.

Accordingly, it would be desirable to provide an interface between optical communication systems, e.g., terrestrial and submarine, which is capable of handling different data rates, in particular OC192 and OC768. Moreover, it would be desirable that such interfaces be relatively transparent to the systems being interfaced and use common components for ease of manufacture and cost savings.

BRIEF SUMMARY OF THE INVENTION

These, and other, drawbacks, limitations and problems associated with conventional optical communication systems are overcome by exemplary embodiments of the present invention, wherein a hybrid OC192/OC768 interface is provided. According to one exemplary embodiment of the present invention, an optical communication system includes at least two terminal units connected to one another by at least one optical fiber, a plurality of line units connected to the at least one optical fiber for amplifying optical signals propagating therethrough, and an interface, connected to each of said at least two terminal units, adapted to process both OC192 data streams and OC768 data streams.

At the transmit side, an interface can include a first input port for receiving a first data stream at a first rate; a second input port for receiving a second data stream at a second rate, wherein the second rate is different than the first rate; a first processing branch for receiving the first data stream, the first processing branch including: a demultiplexer for dividing the first data stream into a plurality of third data streams at a third rate which is less than the first rate; a forward error correction (FEC) unit for adding a forward error correction code to each of the plurality of third data streams to generate FEC encoded data streams; and a multiplexer for combining the FEC encoded data streams to output a composite FEC encoded data stream at substantially the first rate. The interface can also include a second processing branch for receiving the second data stream, the second processing branch including: a demultiplexer for dividing the second data stream into a plurality of fourth data streams at a fourth rate which is less than the second rate; a forward error correction (FEC) unit for adding a forward error correction code to each of the plurality of fourth data streams to generate FEC encoded data streams; and a multiplexer for combining the FEC encoded data streams to output a composite FEC encoded data stream at substantially the first rate.

At the receive side, an interface according to the present invention can include a first receive processing branch for receiving a first data stream at a first data rate, the receive processing branch including: a demultiplexer for dividing the first data stream into a plurality of second data streams; a forward error correction (FEC) unit for removing a forward error correction code associated with each of the second data streams to generate FEC decoded data streams; and a multiplexer for combining the FEC decoded data streams to output a composite FEC decoded data stream at substantially the first data rate. The receive side interface can further include a group of second receive processing branches, which receives a plurality of third data streams at said first data rate, and includes: a demultiplexer for dividing a respective third data stream into a plurality of fourth data streams; a forward error correction (FEC) unit for removing a forward error correction code associated with each of the fourth data streams to generate FEC decoded data streams; and a multiplexer for combining the FEC decoded data streams to output a composite FEC decoded data stream at a second data rate greater than the first data rate.

According to another exemplary embodiment, an optical communication system includes at least two terminal units connected to one another by at least one optical fiber; a plurality of line units connected to the at least one optical fiber for amplifying optical signals propagating therethrough; and an interface, connected to each of the at least two terminal units, adapted to process optical data streams at both a first rate and a second rate different than the first rate. The first rate can be OC768 and the second rate can be OC192.

According to still further exemplary embodiments, methods for interfacing optical communications systems include the steps of: receiving, from a first optical communication system, a data stream at a first rate; providing the data stream to a processing branch associated with the first rate; dividing, in the processing branch, the data stream into a plurality of slower data streams; encoding each of said plurality of slower data streams; combining the encoded, slower data streams into a composite data stream; and transmitting the composite data stream over a second optical communication system at a second rate which is different than the first rate.

DESCRIPTION OF PREFERRED EMBODIMENTS

In the following description, for the purposes of explanation and not limitation, specific details are set forth, such as particular systems, networks, software, components, techniques, etc., in order to provide a thorough understanding of the present invention. However, it will be apparent to one skilled in the art that the present invention may be practiced in other embodiments that depart from these specific details. In other instances, detailed descriptions of known methods, devices and circuits are abbreviated or omitted so as not to obscure the present invention.

Figure 1:
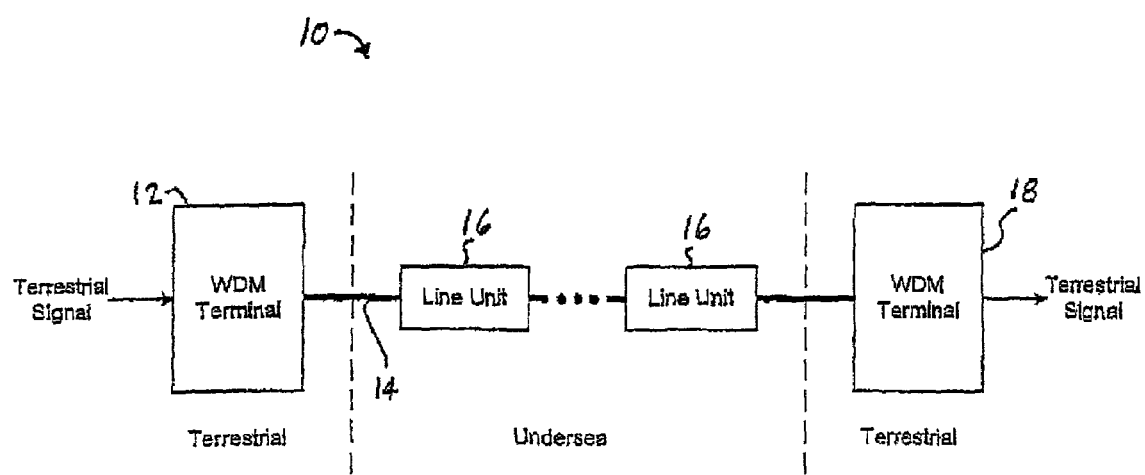
FIG. 1 is a schematic diagram of an optical communication system in which the present invention can be implemented.
Figure 2A:
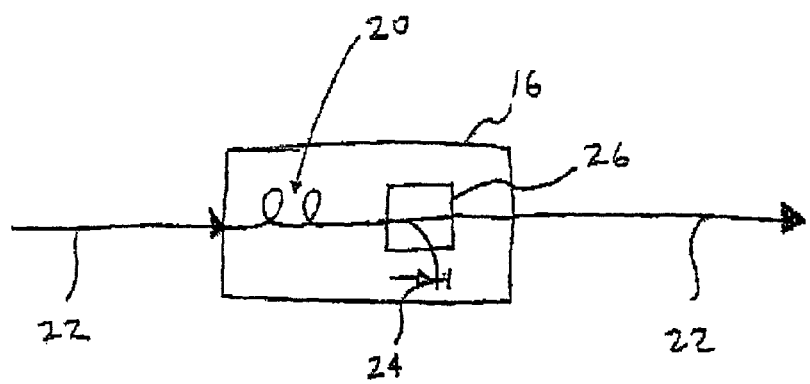
FIG. 2(a) is a conceptual diagram of a conventional erbium-doped fiber amplifier.
Figure 2B:
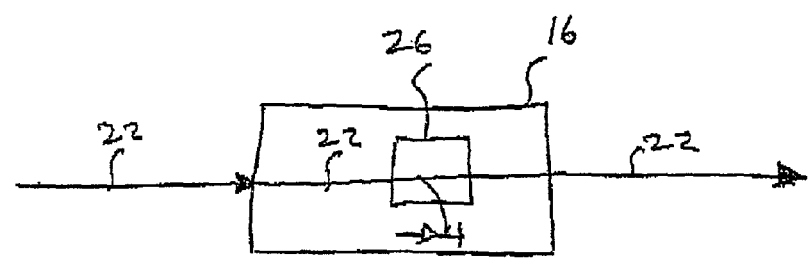
FIG. 2(b) is a conceptual diagram of a conventional Raman amplifier.
Figure 3:
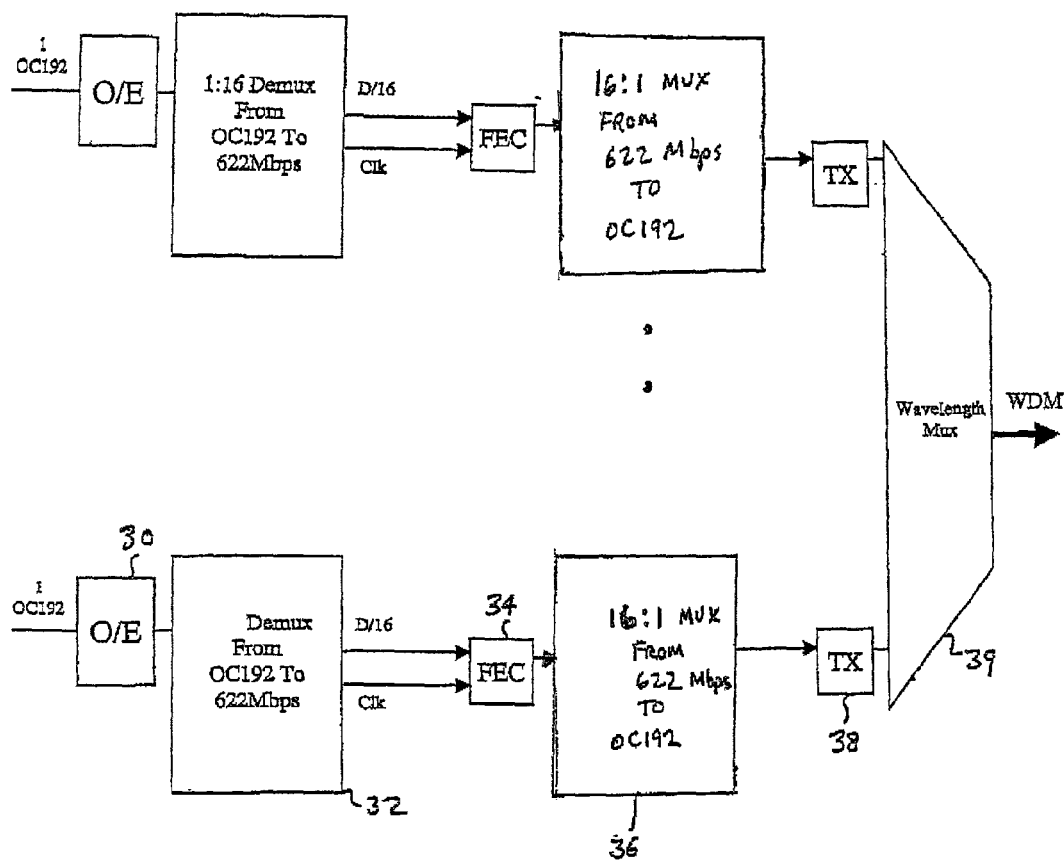
FIG. 3 is a block diagram of a conventional interface for OC192 data streams.

A block diagram of a conventional interface which supports only OC192 data streams is shown in FIG. 3. Therein, an incoming OC192 data stream, e.g., from a terrestrial optical system, is transformed from an optical signal into an electrical signal for further processing at O/E unit 30. Next, the OC192 data stream is demultiplexed, e.g., by a factor of 16 into 622 Mbps data streams, at block 32 (Demux). This demultiplexing operation provides the forward error correction (FEC) unit 34 with data at a rate that is commensurate with its internal processing speed. Once the error correction code has been added, e.g., a block code or a convolutional code, the data streams are then multiplexed back together into a substantially OC192 data stream (plus FEC redundancy) by multiplexer (MUX) 36. Additional processing, e.g., conversion from the electrical domain back into the optical domain, modulation, etc., is performed by transmitter (TX) 38 prior to the wavelength channels associated with each of the OC192 data streams being combined by wavelength multiplexer 39 to generate a WDM signal that is coupled to the optical fiber of the submarine system. Those skilled in the art will appreciate that any number of transmit chains can be employed in the interface of FIG. 2. A similar receive interface is provided in the terminal 12 or 18 to process received optical signals and remove the error correction coding from the incoming data streams.

As mentioned above, future optical communication systems may require support not only for OC192 data streams, but also for OC768 data streams. At the same time, it would be desirable if the support for both OC192 and OC768 data streams was transparent through much of the system to avoid the complexity associated with designing two substantially different networks for handling the different types of data streams.

Figure 4:
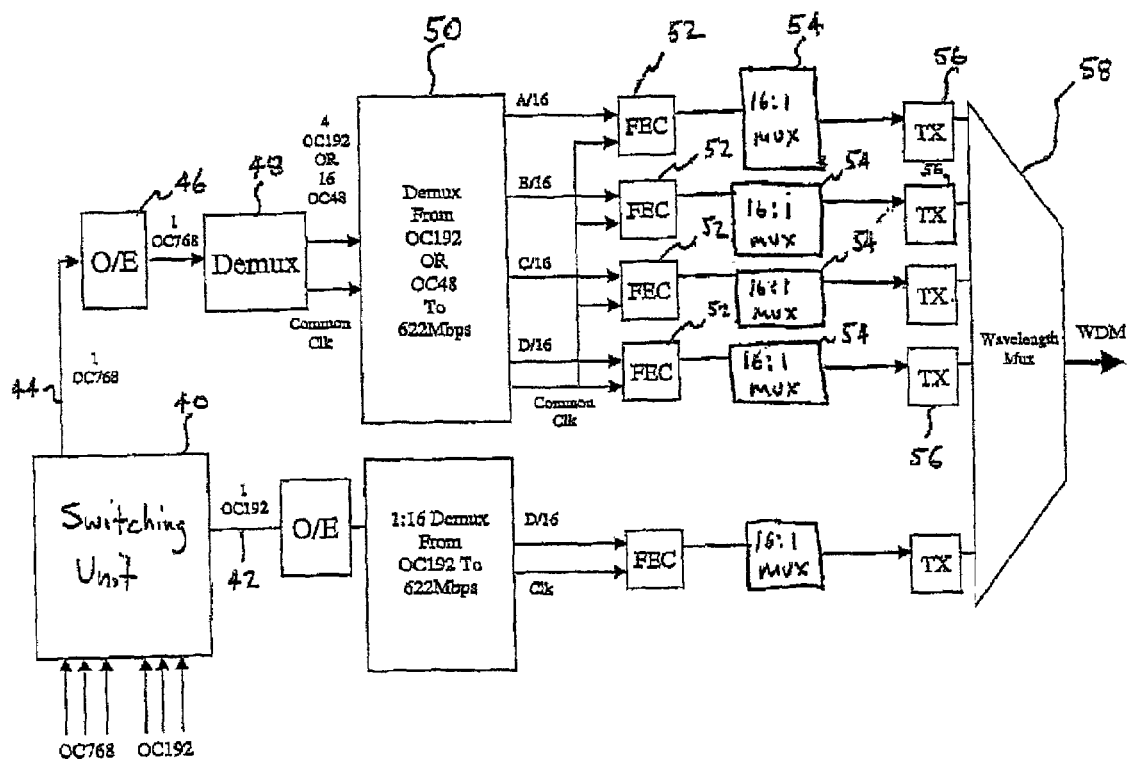
FIG. 4 is a block diagram of an exemplary transmit side interface according to an exemplary embodiment of the present invention.

These objectives, and others, are achieved by way of interfaces according to the present invention, an example of which is seen in FIG. 4. Therein, an exemplary OC192/OC768 transmit side interface is depicted with a number of OC768 and OC192 data streams being received at switching unit 40. Switching unit 40, which can comprise one or more optical switches or optical cross-connects (OXCs), switches incoming OC192 data streams to an OC192 transmit processing branch, e.g., transmit processing branch 42, and switches incoming OC768 data streams to an OC768 transmit processing branch, e.g., transmit processing branch 44. By using transparent, all-optical devices for switching unit 40, the same switch/OXC can be used for different incoming data rates. As discussed below, each OC768 transmit processing branch includes a group of processing sub-branches. Those skilled in the art will appreciate that an actual implementation will typically include many more transmit processing branches.

The OC192 transmit processing branch can be implemented as described above with respect to FIG. 2 and, therefore, is not further described here. An OC768 data stream is O/E converted at block 46 and then demultiplexed in stages 48 and 50 into a plurality of data streams having a data rate that is commensurate with the processing speed of FEC units 52. The selection of a particular FEC unit, and its corresponding processing speed, will vary based upon commercial availability, desired redundancy and performance considerations, such that the data rate of streams output by demultiplexer 50 can vary. However, for this example the FEC units 52 operate on incoming data streams at a rate of 622 Mbps.

Thus, for this exemplary embodiment the incoming data stream is demultiplexed into 64 622 Mbps data streams. Although this is shown in FIG. 4 as being performed in two stages, e.g., from one OC768 data stream to 4 OC192 data streams to 64 622 Mbps data streams or from one OC768 data stream to 16 OC48 data streams to 64 622 Mbps data streams, those skilled in the art will appreciate that more or fewer demultiplexing stages can be used depending upon, e.g., commmercial availability of demultiplexers for the desired rates.

Each group of 16 622 Mbps data streams which is output from demultiplexing stage 50 is input to a respective FEC unit 52 wherein an error correction code is added thereto, e.g., a block code or a convolutional code. An FEC encoded data stream is then output from each FEC unit 52 into a 16:1 multiplexer 54 wherein it is recombined to output a composite FEC encoded data stream which is somewhat greater than the OC192 rate. For example, if the FEC units 52 add redundant bits at a rate of about 15% of the original OC192 data stream, then the output of multiplexers 54 will be about 11.5 Gb/s instead of 10 Gb/s. FEC units which add more or less redundancy than 15% may also be used. For the purposes of this description, references to "about" or "substantially" a particular data rate will be understood to refer to the respective data rate plus additional overhead including, but not limited to, FEC bits. The four composite FEC encoded data streams which comprise the original OC768 data stream are then processed in respective transmit units 56 for transmission on individual channels (wavelengths). The four channels are then combined into a WDM signal, along with other OC192 channels, in WDM multiplexer 58 for transmission over an optical fiber.

To provide orderly processing of signals which are used by the optical communication system to transport OC768 data streams, groups of channels can be designated for this use. For example, if the optical communication system has 200 channels and each OC768 data stream uses four channels, then 100 channels can be designated for use in carrying OC768. Of course the number of channels so designated can be specified in accordance with projected demand for OC768 vs. OC192 data streams and, accordingly, will vary.

One of the features of hybrid interfaces according to the present invention is that each of the processing branches within the group of processing branches that handles an OC768 data stream (in this example four processing branches) can use the same FEC unit, multiplexer and transmitter as in the processing branch handling the OC192 data stream. This simplifies manufacturing of the interfaces (and terminals) and permits the majority of the system to handle the channels which carry portions of an OC768 data stream in the same way as it handles the channels which carry individual OC192 data streams.

Note, however, that the FEC units 52 which are part of a group of processing branches which handle one OC768 data stream share a common clock in the exemplary embodiment of FIG. 4. Since these processing branches have data which needs to be recombined at the receiving terminal, the data frames processed in each branch within the group are synchronized for transmission to ease the reconstruction process. Additionally, the interface provided in the terminal for receiving OC768 data streams according to the present invention includes other mechanisms for synchronizing these data streams as will become apparent from the following discussion of an exemplary receive interface with respect to FIG. 5.

Therein, a WDM signal is received, e.g., from an undersea optical fiber, at wavelength demultiplexer 60. Each channel (wavelength) is processed by a respective receive processing unit 62, e.g., to demodulate and O/E convert the received optical signal. The processed signals are then forwarded to respective demultiplexers 64 which, in this example, divide the substantially OC192 data streams into 16 slower data streams for FEC decoding. Unlike the transmit interface, however, the receive interface also includes a logic function (in this example represented by field programmable gate array (FPGA) 66) which aligns the four portions of the OC768 data stream in time so that they can be properly recombined to accurately reconstruct the terrestrial OC768 data stream that was input to the transmit interface prior to transmission.

Figure 6:
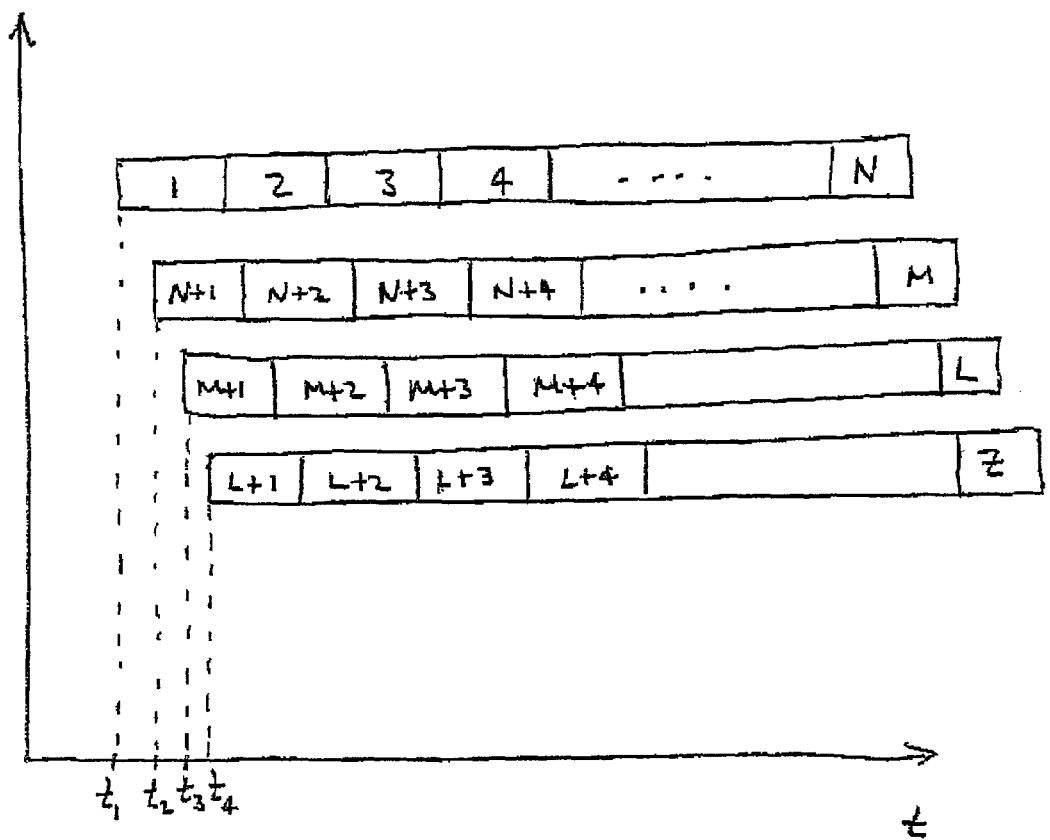
FIG. 6 is a graph depicting exemplary time differences associated with channels that convey portions of an OC768 data stream.

This particular feature of the present invention is significant because, even though the transmit interface provides for synchronous transmission of each channel used to convey a portion of the OC768 data stream, properties of the optical fiber through which these channels propagate tend to spread them out in time. This characteristic of optical fiber as it applies to WDM signals is known as group velocity delay (GVD). FPGA 66, in conjunction with FEC units 68, compensate for GVD of the four channels which carry an OC768 data stream. More specifically, each channel carries data in frames, which frames can include headers with count values that can be identified in the FEC units 68. In this exemplary embodiment, the FPGA 66 obtains timing/header information from each of the FEC units 68 and uses that information to adjust the relative timing of each of the channels which comprise the OC768 data stream prior to recombining them in multiplexer stages 70 and 72. For example, as seen in FIG. 6, suppose that FPGA 66 identifies times $t_1$, $t_2$, $t_3$ and $t_4$ as the beginning times for frames 1, N+1, M+1 and L+1, respectively, which are the first received frames in channels 1–4 which comprise an OC768 data stream. In such a case, FPGA 66 can then align the data within each channel by advancing or retarding the data streams relative to one another, e.g., using a FIFO or an elastic store, based on the known timing values for each channel.

The FEC decoded, composite OC768 data stream is output from multiplexer 72 into E/O conversion unit 74. Again, as with the transmit interface, the multiplexing stages 70 and 72 can be combined into a single stage or distributed into more than two stages. The optical OC768 stream is then provided to switching unit 76 where it is switched onto a terrrestrial OC768 resource (not shown).

The aforegoing exemplary embodiments serve to illustrate one way in which hybrid interfaces according to the present invention can be implemented. Those skilled in the art will appreciate that many variations are possible and contemplated by the present invention. For example, the mechanism for aligning the channels which comprise an OC768 data stream in time need not be an FPGA but, more generally, can be a logic function which resides either within the FEC units or external thereto. If the logic function for aligning the portions of the OC768 data stream is external to the FEC units it can also be implemented as an ASIC or any other logic device.

The grouping of channels for handling data streams at rates exceeding OC192 in accordance with the present invention can also have other impacts on optical communication system design. Each group of channels will, preferably, be transmitted over the same optical fiber to minimize the differences in, e.g, GVD, for grouped channels. Moreover, each group of channels can be identified as a shared risk linked group (SRLG) for purposes of management by a network management system (NMS). This might lead, in turn, to the groups of channels being operated on collectively, e.g., for fault management. For example, if one of the channels within a group fails for some reason, then all four of the channels might be designated as unusuable or switched from a service fiber to a protect fiber.

Although the foregoing exemplary embodiments describe a designation of certain channels for use in communicating OC768 data streams and certain channels for use in communicating OC192 data streams, such a designation need not be fixed. For example, by inserting a switching matrix between the FEC units 52 and the multiplexers 54 on the transmit side (and the FEC units 68 and demultiplexers 64 on the receive side), the number of channels which are allocated for OC768 and OC192 data stream handling can be varied. This feature of the present invention is made possible by the fact that the same components, e.g., FEC units, multiplexers, demultiplexers, transmitters and receivers, are used to handle both types of data streams.

Figure 7:
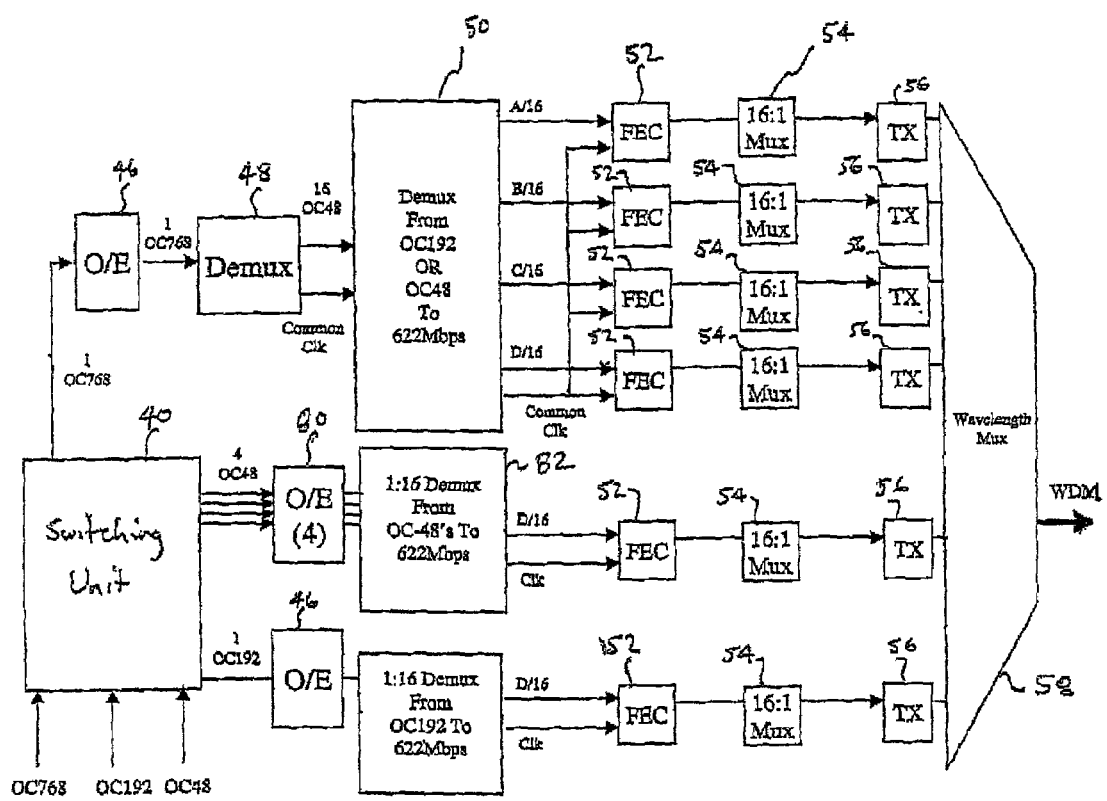
FIG. 7 depicts another exemplary embodiment of the present invention.
Figure 4:
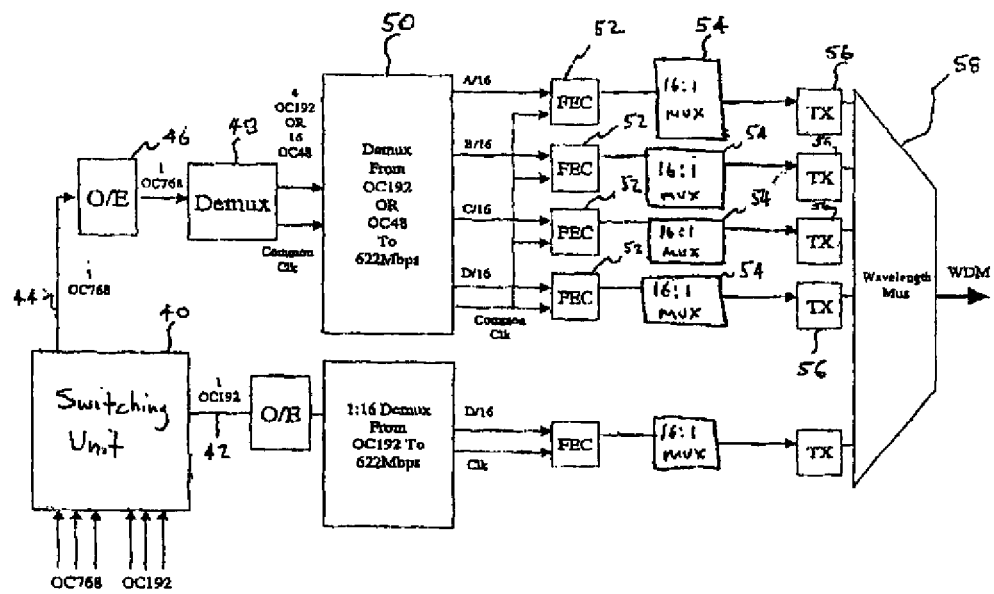

The present invention can also be expanded to include data streams having other rates. For example, as shown in FIG. 7, interfaces according to the present invention can also accommodate OC48 data streams. In this figure, the same reference numerals are used to reference similar units as in FIG. 4, the descriptions of which are omitted here. In addition to the OC192 and OC768 processing branches described above, an OC48 processing branch has been added. Therein, four OC48 data streams are grouped together by the switching unit 40 for transmission on a particular channel. These four OC48 data streams are O/E converted at unit 80 prior to being demultiplexed into 16 622 Mbps data streams by unit 82. The resulting data streams are then FEC encoded, multiplexed and processed for transmission as in the other processing branches.

Figure 5:
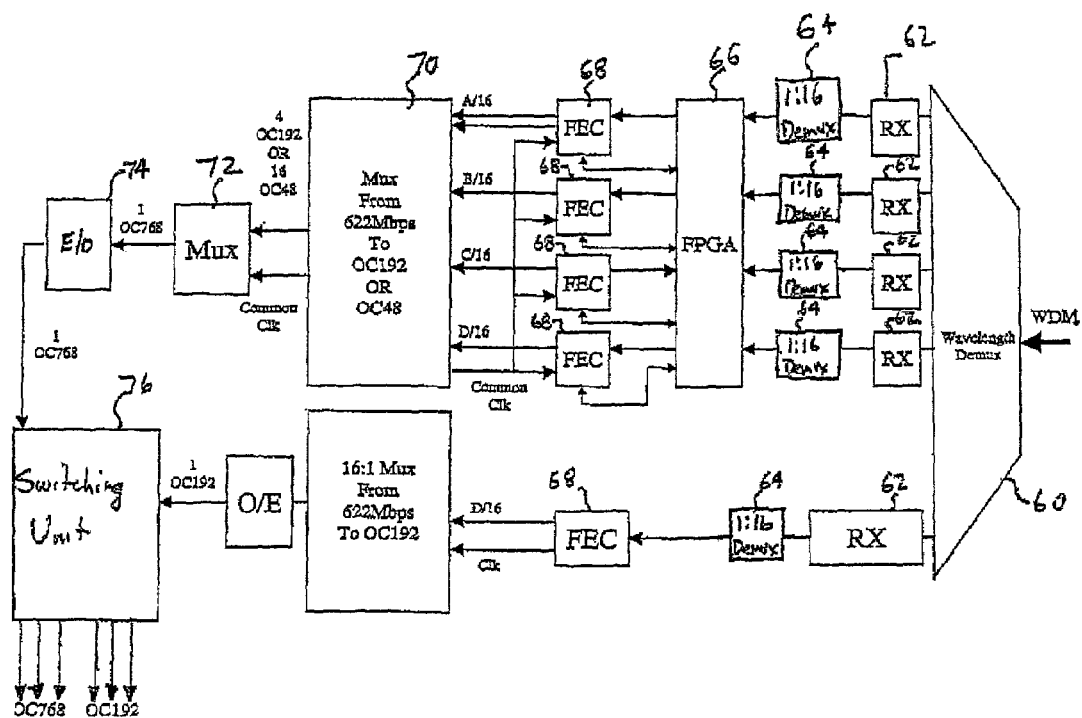
FIG. 5 is a block diagram of an exemplary receive side interface according to an exemplary embodiment of the present invention.

The hybrid nature of interfaces according to the present invention is not limited to having different rate inputs and outputs of the optical communication system. For example, the present invention provides techniques for transmitting OC768 data streams over WDM channels operating at OC192, which techniques can be used independently from the transmission of OC48 and OC192 data streams. That is, according to one exemplary embodiment of the present invention, an interface can be configured as illustrated in FIGS. 4 and 5, but without the OC192 inputs, outputs and processing branches.

Additionally, although the foregoing exemplary embodiments have been illustrated using various OC data stream rates, those skilled in the art will also appreciate that the present invention provides techniques which can be used to accommodate the transmission of any data rate which may be desirable in optical communication systems, e.g., 20 Gbps or 80 Gbps.

The groups of channels or SLRGs described in accordance with the present invention are can be implemented using different network protection architectures, such as mesh architectures, unprotected architectures, 1+1 protection schemes, 1:N protection schemes.

The preferred embodiments have been set forth herein for the purpose of illustration. However, this description should not be deemed to be a limitation on the scope of the invention. Accordingly, various modifications, adaptations, and alternatives may occur to one skilled in the art without departing from the scope of the claimed inventive concept.

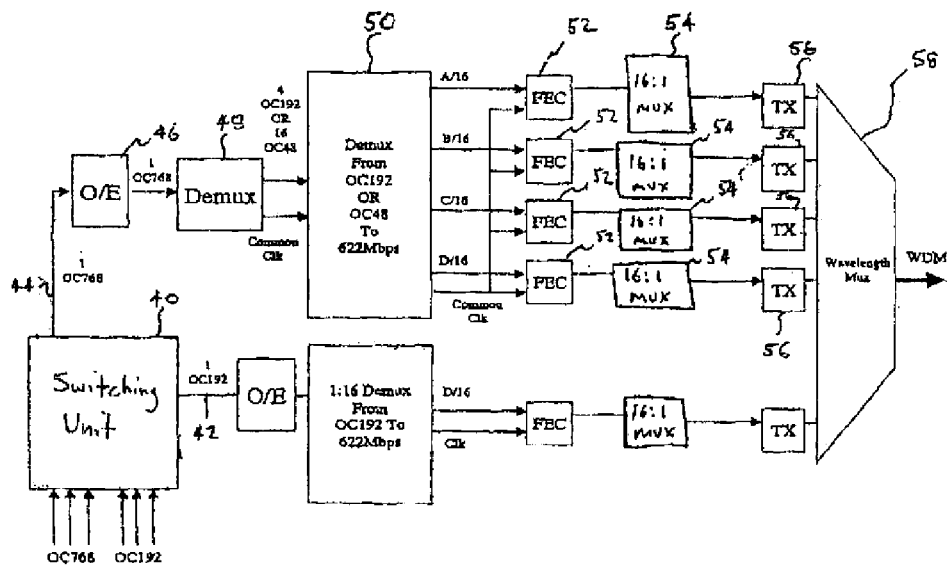

The invention claimed is:

1. An optical signal interface comprising:
   a first input port for receiving a first data stream at a first rate;
   a second input port for receiving a second data stream at a second rate, wherein said first rate is OC192 and said second rate is OC768;
   a first processing branch for receiving said first data stream, said first processing branch including:
      a demultiplexer for dividing said first data stream into a plurality of third data streams at a third rate which is less than said first rate;
      a forward error correction (FEC) unit for adding a forward error correction code to each of said plurality of third data streams to generate FEC encoded data streams; and
      a multiplexer for combining said FEC encoded data streams to output a composite FEC encoded data stream at substantially said first rate; and
   a second processing branch for receiving said second data stream, said second processing branch including:
      a demultiplexer for dividing said second data stream into a plurality of fourth data streams at a fourth rate which is less than said second rate;
      a plurality of forward error correction (FEC) units that share a common clock for adding a forward error correction code to each of said plurality of fourth data streams to generate FEC encoded data streams; and
      a multiplexer for combining said FEC encoded data streams to output a composite FEC encoded data stream at substantially said first rate.

2. The interface of claim 1, wherein said third rate and said fourth rate are equal.

3. The interface of claim 1, wherein said third rate is 622 Mbps.

4. The interface of claim 1, wherein said demultiplexer in said second processing branch includes a plurality of demultiplexing stages.

5. The interface of claim 1, further comprising at least one optical switch for selectively connecting said first input port with said first processing branch and said second input port with said second processing branch.

6. An optical signal interface comprising:
a first input port for receiving a first data stream at a first rate;
a second input port for receiving a second data stream at a second rate, wherein said second rate is different than said first rate;
a first processing branch for receiving said first data stream, said first processing branch including:
a demultiplexer for dividing said first data stream into a plurality of third data streams at a third rate which is less than said first rate;
a forward error correction (FEC) unit for adding a forward error correction code to each of said plurality of third data streams to generate FEC encoded data streams; and
a multiplexer for combining said FEC encoded data streams to output a composite FEC encoded data stream at substantially said first rate; and
a second processing branch for receiving said second data stream, said second processing branch including:
a demultiplexer for dividing said second data stream into a plurality of fourth data streams at a fourth rate which is less than said second rate;
a forward error correction (FEC) unit for adding a forward error correction code to each of said plurality of fourth data streams to generate FEC encoded data streams;
a multiplexer for combining said FEC encoded data streams to output a composite FEC encoded data stream at substantially said first rate; and
at least one optical switch for selectively connecting said first input port with said first processing branch and said second input port with said second processing branch.

7. The interface of claim 6, wherein said first rate is OC192 and said second rate is OC768.

8. The interface of claim 6, wherein the at least one optical switch comprises an optical cross-connect.

9. The interface of claim 6, wherein said forward error correction unit in said second processing branch includes a plurality of forward error correction units that share a common clock.

10. An optical signal interface comprising:
a first receive processing branch for receiving a first data stream at substantially a first data rate, said receive processing branch including:
a demultiplexer for dividing said first data stream into a plurality of second data streams;
a forward error correction (FEC) unit for removing a forward error correction code associated with each of said second data streams to generate FEC decoded data streams; and
a multiplexer for combining said FEC decoded data streams to output a composite FEC decoded data stream at said first data rate; and
a group of second receive processing branches, which receives a plurality of third data streams at substantially said first data rate, and includes:
a demultiplexer for dividing a respective third data stream into a plurality of fourth data streams;
a plurality of forward error correction (FEC) units that share a common clock for removing a forward error correction code associated with each of said fourth data streams to generate FEC decoded data streams; and
a multiplexer for combining said FEC decoded data streams to output a composite FEC decoded data stream at a second data rate greater than said first data rate.

11. The interface of claim 10, wherein said first rate is OC192 and said second rate is OC768.

12. The interface of claim 11, wherein said group of second receive processing branches includes four branches.

13. The interface of claim 10, wherein said second data streams and said fourth data streams have the same data rate.

14. The interface of claim 10, wherein said demultiplexer in said second processing branch includes a plurality of demultiplexing stages.

15. The interface of claim 10, wherein said group of second receive processing branches further comprises:
means for aligning said plurality of third data streams in time.

16. The interface of claim 15, wherein said means for aligning said plurality of third data streams in time is a logic unit which is connected to said FEC unit.

17. The interface of claim 16, wherein said logic unit is one of a field programmable gate array (FPGA) and a digital signal processor (DSP).

18. An optical communication system comprising:
at least two terminal units connected to one another by at least one optical fiber;
a plurality of line units connected to said at least one optical fiber for amplifying optical signals propagating therethrough; and
an interface according to claim 10, connected to each of said at least two terminal units, adapted to process optical data streams at both a first rate and a second rate different than said first rate.

19. The optical communication system of claim 18, wherein said first rate is OC192 and said second rate is OC768.

20. The optical communication system of claim 19, wherein said interface has at least one OC 192 input and at least one OC768 input.

21. The optical communication system of claim 19, wherein said interface has only OC768 inputs and OC192 outputs.

22. The optical communication system of claim 19, wherein said OC192 data streams carry data at a rate of about 10 Gb/s and said OC 768 data streams carry data at a rate of about 40 Gb/s.

23. The optical communication system of claim 18, wherein one of said first rate and said second rate is OC48.

24. The optical communication system of claim 18, wherein said interface includes means for aligning a plurality of data streams in time, which data streams are subsequently combined to form said data streams of said second rate.

25. The interface of claim 24, wherein said means for aligning said plurality of data streams in time is a logic unit which is connected to a forward error correction (FEC) unit.

26. The interface of claim 25, wherein said logic unit is one of a field programmable gate array (FPGA) and a digital signal processor (DSP).

27. The interface of claim 10, further comprising at least one optical switch for selectively connecting an output of said first receive processing branch with a respective first output and an output of said group of second receive processing branches with a respective second output port.

28. The interface of claim 18, wherein said interface includes at least one optical switch for switching said first rate data streams and said second rate data streams into different branches of said interface.

29. The interface of claim 18, wherein said interface includes at least one optical switch for switching said first rate data streams and said second rate data streams out of different branches of said interface.

30. The interface of claim 18, wherein a first plurality of WDM channels are allocated for handling said first rate data streams and a second plurality of WDM channels are allocated for handling said second rate data streams.

31. The interface of claim 30, wherein said first and second plurality of channels are fixed.

32. The interface of claim 30, wherein said first and second plurality of channels are variable.

33. The interface of claim 30, wherein a group of said second plurality of WDM channels are assigned to handle each of said second rate data streams.

34. The interface of claim 33, wherein said group of WDM channels are transmitted over a same optical fiber.

35. The interface of claim 33, wherein said group of WDM channels are handled as a single logical entity for network protection schemes.

36. The system of claim 18, further comprising:
a mesh network protection architecture scheme.

37. The system of claim 18, further comprising:
a 1+1 network protection architecture scheme.

38. The system of claim 18, further comprising:
a 1:N network protection architecture scheme.

39. An optical signal interface comprising:
a first receive processing branch for receiving a first data stream at substantially a first data rate, said receive processing branch including:
a demultiplexer for dividing said first data stream into a plurality of second data streams;
a forward error correction (FEC) unit for removing a forward error correction code associated with each of said second data streams to generate FEC decoded data streams; and
a multiplexer for combining said FEC decoded data streams to output a composite FEC decoded data stream at said first data rate; and
a group of second receive processing branches, which receives a plurality of third data streams at substantially said first data rate, and includes:
a demultiplexer for dividing a respective third data stream into a plurality of fourth data streams;
a forward error correction (FEC) unit for removing a forward error correction code associated with each of said fourth data streams to generate FEC decoded data streams;
a multiplexer for combining said FEC decoded data streams to output a composite FEC decoded data stream at a second data rate greater than said first data rate; and
at least one optical switch for selectively connecting an output of said first receive processing branch with a respective first output and an output of said group of second receive processing branches with a respective second output port.

40. The interface of claim 39, wherein the at least one optical switch comprises an optical cross-connect.

41. The interface of claim 39, wherein said FEC unit in said group of second receive processing branches includes a plurality of FEC units that share a common clock.

42. A method for interfacing optical communication systems comprising the steps of:
receiving, from a first optical communication system, a data stream at a first rate wherein receiving includes receiving, from the first optical communication system, an OC768 data stream over a plurality of wave division multiplexed (WDM) channels;
providing said data stream to a processing branch associated with said first rate and switching said data stream to said associated processing branch using one of an optical switch and an optical cross-connect;
dividing, in said processing branch, said data stream into a plurality of slower data streams;
encoding each of said plurality of slower data streams wherein encoding includes forward error correction (FEC) decoding and time aligning said plurality of WDM channels;
combining said encoded, slower data streams into a composite data stream wherein combining includes combining said decoded, time aligned WDM channels into said OC768 data stream; and
transmitting said composite data stream over a second optical communication system at a second rate which is different than said first rate wherein transmitting includes transmitting said OC768 data stream over the second optical communication system.

43. The method of claim 42, wherein said step of encoding further comprises the step of:
synchronizing the encoding of each of said plurality of slower data streams.

44. The method of claim 42, wherein said first optical communication system is a terrestrial optical communication system and said second optical communication system is a submarine optical communication system.

45. The method of claim 42, wherein said first rate is OC768 and said second rate is substantially OC192.

46. The method of claim 42, wherein said first rate is OC48 and said second rate is substantially OC192.

47. The method of claim 42, wherein said first optical communication system is a submarine optical communication system and said second optical communication system is a terrestrial optical communication system.

48. The method of claim 42, wherein said step of time aligning further comprises the steps of:
identifying frame boundaries within each of said plurality of WDM channels; and
selectively advancing or retarding data within one or more of said plurality of WDM channels to time align said frame boundaries.

49. An interface for an optical communication system comprising:
an optical cross-connect having a plurality of inputs thereto, said inputs including:
a first set of data streams at a first rate, wherein said first set of data streams at a first rate is a single OC768 data stream;
a second set of data streams at a second rate;
a third set of data streams at a third rate, wherein said first, second and third rates are each different;
a plurality of first processing branches connected to said optical cross-connect, wherein first said processing branch demultiplexers said first set of data streams to a plurality of data streams at a fourth data rate, adds error correction coding to each of said data streams at said fourth data rate to generate a plurality of composite data streams and multiplexes said composite data streams into a plurality of data streams at a fifth rate;

a plurality of second processing branches connected to said optical cross-connect; and a plurality of third processing branches connected to said optical cross-connect;

wherein said optical cross-connect selectively transfers said first second and third sets of data streams to a respective one of said first, second and third processing branches.

50. The interface of claim 49, wherein said second set of data streams at a second rate is a single OC192 data stream.

51. The interface of claim 49, wherein said third set of data streams at a third rate is four OC48 data streams.

52. The interface of claim 49, wherein said plurality of data streams at said fifth rate are treated as a logical group for switching.

53. The interface of claim 49, wherein said plurality of data streams at said fifth rate are transmitted over a same optical fiber.

54. The interface of claim 49, wherein said first processing branch includes two demultiplexing stages.

55. The interface of claim 49, wherein said fourth data rate is 622 Mbps and said fifth data rate is approximately 11.5 Gb/s.

56. The interface of claim 49, wherein said second processing branch demultiplexes said second set of data streams to a plurality of data streams at the fourth data rate, adds error correction coding to each of said data streams at said fourth data rate to generate a plurality of composite data streams and multiplexes said composite data streams into a single data stream at a fifth rate.

57. The interface of claim 56, wherein said fourth data rate is 622 Mbps and said fifth data rate is approximately 11.5 Gb/s.

58. The interface of claim 49, wherein said third processing branch demultiplexes said third set of data streams to a plurality of data streams at the fourth data rate, adds error correction coding to each of said data streams at said fourth data rate to generate a plurality of composite data streams and multiplexes said composite data streams into a single data stream at a fifth rate.

59. The interface of claim 58, wherein said fourth data rate is 622 Mbps and said fifth data rate is approximately 11.5 Gb/s.

\* \* \* \* \*

UNITED STATES PATENT AND TRADEMARK OFFICE
CERTIFICATE OF CORRECTION

| | | |
|---|---|---|
| PATENT NO. | : 7,039,067 B2 | |
| APPLICATION NO. | : 09/917171 | |
| DATED | : May 2, 2006 | |
| INVENTOR(S) | : Lee Daniel Feinberg et al. | |

It is certified that error appears in the above-identified patent and that said Letters Patent is hereby corrected as shown below:

Delete the title page and substitute therefore the attached title page consisting of corrected illustrative figure.

Delete Drawing Sheet 4 of 7 and substitute therefore the attached Drawing Sheet 4 of 7.

Signed and Sealed this

Fifteenth Day of December, 2009

David J. Kappos
*Director of the United States Patent and Trademark Office*

(12) United States Patent
Feinberg et al.

(10) Patent No.: US 7,039,067 B2
(45) Date of Patent: May 2, 2006

(54) METHODS AND SYSTEMS FOR HYBRID INTERFACES AND ARCHITECTURES FOR OPTICAL COMMUNICATIONS

(75) Inventors: Lee Daniel Feinberg, Silver Spring, MD (US); Brent Ashley Miller, Baltimore, MD (US); William C. Phillips, Ellicott City, MD (US)

(73) Assignee: Dorsal Networks, Inc., Columbia, MD (US)

( * ) Notice: Subject to any disclaimer, the term of this patent is extended or adjusted under 35 U.S.C. 154(b) by 861 days.

(21) Appl. No.: 09/917,171

(22) Filed: Jul. 30, 2001

(65) Prior Publication Data
US 2003/0021300 A1 Jan. 30, 2003

(51) Int. Cl.
H04L 12/56 (2006.01)
(52) U.S. Cl. .................... 370/468; 370/535
(58) Field of Classification Search ........... 370/464, 370/465, 468, 498, 535, 536, 537, 538; 398/54, 398/56
See application file for complete search history.

(56) References Cited

U.S. PATENT DOCUMENTS

| | | | |
|---|---|---|---|
| 5,764,405 A | 6/1998 | Alphonsus | |
| 5,912,755 A | 6/1999 | Bergano | |
| 5,912,761 A | 6/1999 | Jander et al. | |
| 5,938,309 A | 8/1999 | Taylor | |
| 5,946,119 A | 8/1999 | Bergano et al. | |
| 5,966,206 A | 10/1999 | Jander | |
| 6,014,479 A | 1/2000 | Darcie | |
| 6,057,950 A | 5/2000 | Bergano | |
| 6,084,694 A * | 7/2000 | Milton et al. | 398/83 |
| 6,147,796 A | 11/2000 | Ma et al. | |
| 6,304,351 B1 | 10/2001 | Pedersen | |
| 6,310,709 B1 | 10/2001 | Bergano | |
| 6,327,250 B1 | 12/2001 | Chen et al. | |
| 6,341,023 B1 | 1/2002 | Puc | |
| 6,433,904 B1 * | 8/2002 | Swanson et al. | 398/91 |
| 6,532,320 B1 * | 3/2003 | Kikuchi et al. | 385/24 |

OTHER PUBLICATIONS

Gadiraju et al. "Channel Protection Switching in WDM Mesh Networks". IEEE. May 29-31, 2001. pp. 26-30.*
Dick et al. "Configurable Logic for Digital Communications: Some Singal Processing Perspectives". IEEE. Aug. 1999. pp. 107-111.*
Afferton et al. "Optical Networking—A Multi-service Global Carrier's View". IEEE. Nov. 8-11, 1999. pp. 399-400.*
P.K. Runge et al., "AT&T Optical Amplifier Systems" AT&T Bell Laboratories Pub., pp. 72-77.

(Continued)

Primary Examiner—Ricky Q. Ngo
Assistant Examiner—Derrick W Ferris

(57) ABSTRACT

A hybrid interface for handling different types of data streams is disclosed. Both OC192 and OC768 data streams can be transported between terrestrial and submarine systems using hybrid interfaces. Examples include processing branches that use common FEC units, multiplexers, demultiplexers, transmitters and receivers for both types of data streams. WDM channels are allocated in groups for OC768 data stream handling. Time misalignment between received channels within a group is identified and compensated.

59 Claims, 7 Drawing Sheets